United States Patent [19]
Muller et al.

[11] Patent Number: 6,016,310
[45] Date of Patent: Jan. 18, 2000

[54] TRUNKING SUPPORT IN A HIGH PERFORMANCE NETWORK DEVICE

[75] Inventors: Shimon Muller, Sunnyvale; Ariel Hendel, Cupertino, both of Calif.

[73] Assignee: Sun Microsystems, Inc., Mountain View, Calif.

[21] Appl. No.: 08/885,233

[22] Filed: Jun. 30, 1997

[51] Int. Cl.$^7$ .............................. H04L 12/28; H04L 12/56
[52] U.S. Cl. ........................................... 370/255; 370/401
[58] Field of Search ................................... 370/389, 392, 370/396, 398, 400, 401, 402, 403, 404, 411, 254, 255

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/422 |
| 4,652,874 | 3/1987 | Loyer | 340/825.05 |
| 4,737,953 | 4/1988 | Koch et al. | 370/94 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/427 |
| 4,922,503 | 5/1990 | Leone | 370/85.13 |
| 4,933,938 | 6/1990 | Sheehy | 370/85.13 |
| 4,935,869 | 6/1990 | Yamamoto | 364/200 |
| 5,130,977 | 7/1992 | May et al. | 370/60 |
| 5,150,358 | 9/1992 | Punj et al. | 370/468 |
| 5,159,685 | 10/1992 | Kung | 395/575 |
| 5,163,046 | 11/1992 | Hahne et al. | 370/79 |
| 5,210,746 | 5/1993 | Maher et al. | 370/79 |
| 5,220,562 | 6/1993 | Takada et al. | 370/401 |
| 5,231,633 | 7/1993 | Hluchyj et al. | 370/94.1 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/725 |
| 5,309,437 | 5/1994 | Perlman et al. | 340/827 |
| 5,313,454 | 5/1994 | Bustini et al. | 370/13 |

(List continued on next page.)

FOREIGN PATENT DOCUMENTS 13016  6/1998  WIPO .

OTHER PUBLICATIONS

International Search Report, PCT/US98/13368, 5 pages.
International Search Report, PCT/US98/13364, 4 pages.
International Search Report, PCT/US98/13365, 4 pages.

(List continued on next page.)

*Primary Examiner*—Chau Nguyen
*Assistant Examiner*—Soon-Dong Hyun
*Attorney, Agent, or Firm*—Blakely, Sokoloff, Taylor & Zafman

[57] ABSTRACT

A method and apparatus for providing trunking support in a network device is provided. According to one aspect of the present invention, a network device includes at least one port that is configured to be included in a trunk. The network device also includes a memory for storing a forwarding database. The forwarding database includes entries containing therein forwarding information for a subset of network addresses. The network device further includes a learning circuit. The learning circuit is coupled to the trunked port and the memory. The learning circuit is configured to modify the forwarding database to reflect an association between the trunked port and a first address contained within a packet received by the trunked port. If the trunk is of a first type, the learning circuit updates the forwarding database based upon a trunk designator corresponding to the trunk; otherwise, the learning circuit updates the forwarding database based upon a port designator corresponding to the trunked port. According to another aspect of the present invention, a packet is received by a network device on one of its input ports. The packet contains therein header information including a destination address. A forwarding database is searched for the destination address. If the destination address is not found in the forwarding database and the output trunk is coupled to a network device of a first type, then load balancing is performed to assure the packet is forwarded to only one port of the output trunk. However, if the output trunk is coupled to a network device of a second type, then the packet is forwarded to all ports of the output trunk.

33 Claims, 12 Drawing Sheets

U.S. PATENT DOCUMENTS

| | | | |
|---|---|---|---|
| 5,343,471 | 8/1994 | Cassagnol | 370/85.13 |
| 5,353,412 | 10/1994 | Douglas et al. | 395/325 |
| 5,365,514 | 11/1994 | Hershey et al. | 370/241 |
| 5,386,413 | 1/1995 | McAuley et al. | 370/54 |
| 5,392,432 | 2/1995 | Engelstad et al. | 395/700 |
| 5,394,402 | 2/1995 | Ross | 370/94.1 |
| 5,396,602 | 3/1995 | Amini et al. | 395/325 |
| 5,402,415 | 3/1995 | Turner | 370/60 |
| 5,404,538 | 4/1995 | Krappweis, Sr. | 395/725 |
| 5,410,540 | 4/1995 | Aiki et al. | 370/390 |
| 5,410,722 | 4/1995 | Cornaby | 395/800 |
| 5,420,862 | 5/1995 | Perlman | 370/85.13 |
| 5,422,838 | 6/1995 | Lin | 395/49 |
| 5,425,026 | 6/1995 | Mori | 370/401 |
| 5,425,028 | 6/1995 | Britton et al. | 370/94.1 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,611 | 10/1995 | Drake, Jr. et al. | 370/54 |
| 5,461,624 | 10/1995 | Mazzola | 370/402 |
| 5,473,607 | 12/1995 | Hausman | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/255 |
| 5,485,578 | 1/1996 | Sweazey | 395/200.54 |
| 5,490,139 | 2/1996 | Baker et al. | 370/60 |
| 5,490,252 | 2/1996 | Macera et al. | 395/200.01 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 340/402 |
| 5,517,488 | 5/1996 | Miyazaki et al. | 370/16 |
| 5,535,202 | 7/1996 | Kondoh | 370/60.1 |
| 5,550,816 | 8/1996 | Hardwick et al. | 370/60 |
| 5,553,067 | 9/1996 | Walker et al. | 370/60 |
| 5,555,405 | 9/1996 | Griesmaer et al. | 395/600 |
| 5,557,610 | 9/1996 | Calamvokis et al. | 370/60.1 |
| 5,561,666 | 10/1996 | Christensen et al. | 370/434 |
| 5,561,791 | 10/1996 | Mendelson et al. | 395/550 |
| 5,563,878 | 10/1996 | Blakeley et al. | 370/60 |
| 5,566,170 | 10/1996 | Bakke et al. | 370/60 |
| 5,570,365 | 10/1996 | Yodhida | 370/85.6 |
| 5,572,522 | 11/1996 | Calamvokis et al. | 370/395 |
| 5,583,981 | 12/1996 | Pleyer | 395/326 |
| 5,592,476 | 1/1997 | Calamvokis et al. | 370/390 |
| 5,594,727 | 1/1997 | Kolbenson et al. | 370/468 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,615,340 | 3/1997 | Dai et al. | 395/200.17 |
| 5,617,421 | 4/1997 | Chin et al. | 370/402 |
| 5,619,500 | 4/1997 | Hiekali | 370/414 |
| 5,619,661 | 4/1997 | Crews et al. | 395/299 |
| 5,623,489 | 4/1997 | Cotton et al. | 370/381 |
| 5,633,710 | 5/1997 | Mandal et al. | 364/514 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,741 | 10/1997 | Aggarwal et al. | 370/200.12 |
| 5,684,800 | 11/1997 | Dobbins et al. | 370/401 |
| 5,689,506 | 11/1997 | Chiussi et al. | 370/388 |
| 5,689,518 | 11/1997 | Galand et al. | 371/37.1 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,358 | 3/1998 | Headrick et al. | 370/418 |
| 5,726,977 | 3/1998 | Lee | 370/235 |
| 5,734,651 | 3/1998 | Blakeley et al. | 370/392 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 370/351 |
| 5,745,048 | 4/1998 | Taguchi et al. | 340/870.01 |
| 5,748,631 | 5/1998 | Bergantino et al. | 370/398 |
| 5,748,905 | 5/1998 | Hauser et al. | 395/200.79 |
| 5,751,967 | 5/1998 | Raab et al. | 395/200.58 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 | 6/1998 | Christensen et al. | 370/401 |
| 5,764,636 | 6/1998 | Edsall | 370/401 |
| 5,781,549 | 7/1998 | Dai | 370/398 |
| 5,784,573 | 7/1998 | Szczepanek et al. | 395/200.8 |
| 5,790,546 | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |
| 5,802,278 | 9/1998 | Isfeld et al. | 395/200.02 |
| 5,812,527 | 9/1998 | Kline et al. | 370/232 |
| 5,815,737 | 7/1998 | Buckland | 395/905 |
| 5,822,319 | 10/1998 | Nagami et al. | 370/392 |
| 5,825,767 | 10/1998 | Mizukoshi et al. | 370/395 |
| 5,835,491 | 11/1998 | Davis et al. | 370/386 |
| 5,838,677 | 11/1998 | Kozaki et al. | 370/389 |
| 5,856,977 | 1/1999 | Yang et al. | 370/411 |
| 5,859,849 | 1/1999 | Parks | 370/395 |
| 5,872,783 | 2/1999 | Chin | 370/392 |
| 5,875,464 | 2/1999 | Kirk | 711/129 |
| 5,931,980 | 11/1998 | Varma et al. | 370/395 |

OTHER PUBLICATIONS

International Standard ISO/IEC 10038, ANSI/IEEE Std 802.1D, First Edition, 1993.

"Load Balancing for Multiple Interfaces for Transmission Control Protocol/Internet Protocol for VM/MVS", IBM Technical Disclosure Bulletin, 38(9):7–9 (Sep. 1995).

T. Nishizono et al., "Analysis on a Multilink Packet Transmission System", Electron. Commun. JPN 1, Commun., (USA), 68(9): 98–104 (Sep. 1985).

International Search Report, PCT/US 98/13380.

International Search Report, PCT/US98/13206, 8 pages.

International Search Report, PCT/US98/13362, 5 pages.

International Search Report, PCT/US98/13203, 7 pages.

International Search Report, PCT/US98/13361, 5 pages.

International Search Report, PCT/US98/13200, 6 pages.

International Search Report, PCT/US98/13202, 4 pages.

International Search Report, PCT/US98/13177, 4 pages.

International Search Report, PCT/US98/13199, 5 pages.

International Search Report, PCT/US98/13015, 5 pages.

Wang et al., A Novel Message Switch for Highly Parallel Systems, IEEE, pp. 150–155, 1989.

Tobagi, Fast Packet SwitchArchitectures for Broadband Integrated Services Digital Networks, Proceedings of the IEEE, vol. 78, Issue 1, pp. 133–167, Jan. 1990.

Fliesser et al., Design of a Multicast ATM Packet Switch, Electrical and Computer Engineering, 1993 Canadian Conference, pp. 779–783, 1993.

Chang et al., An Overview of the Pipelined Common Buffer Architecture (PCBA) for Memory Based Packet/Cell Switching Systems, Local Computer Networks, 1994, pp. 288–297, 19th Conference, IEEE.

Agrawal et al., A Scalable Shared Buffer ATM Switch Architecture, VLSI, 1995 5th Great Lakes Symposium, IEEE, pp. 256–261, 1994.

Sabaa et al., Implementation of a Window–Based Scheduler in an ATM Switch, Electrical and Computer Engineering, 1995 Canadian Conference, IEEE, pp. 32–35, 1995.

Naraghi–Pour et al., A Multiple Shared Memory Switch, System Theory, 1996 Southeastern Symposium, IEEE, p. 50–54 1996.

Iyengar et al., Switching Prioritized Packets, GLOBECOM '89: IEEE Global Telecommunications Conference, pp. 1181–1186, 1989.

"Foundry Products", downloaded from Website http://www.foundrynet.com/ on Jun. 19, 1997.

Anthony J. McAuley & Paul Francis, "Fast Routing Table Lookup Using CAMs", IEEE, 1993, pp. 1382–1390.

"Gigabit Ethernet", Network Strategy Report, The Burton Group, v2, May 8, 1997 40 pages.

"IP On Speed", Erica Roberts, Internet–Draft, Data Communications on the Web, Mar. 1997, 12 pages.

"Multilayer Topology", White Paper, Internet–Draft, 13 pages, downloaded from Website http://www.baynetworks.com on Apr. 18, 1997.

TRUNKING SUPPORT IN A HIGH PERFORMANCE NETWORK DEVICE

FIELD OF THE INVENTION

The invention relates generally to the field of computer networking devices. More particularly, the invention relates to a network device building block that facilitates combining multiple parallel physical network links into one logical channel.

BACKGROUND OF THE INVENTION

Generally, trunking can be thought of as a means of providing bandwidth aggregation between two points in a network (e.g., between two network devices). FIG. 1 is useful for illustrating the concept of trunking. A first device 105 and a second device 110 are connected through a plurality of physical network links 115–117. The first device 105 and the second device 110 may be network devices, such as a server, client, repeater, bridge, router, brouter, switch, or the like. The first device 105 includes ports 106–109 and the second device 110 includes ports 111–114. The ports provide the device with access to the attached network link by implementing appropriate network protocols such as the Ethernet protocol.

In this example, the physical network links 115–117 have been combined to form one logical channel, a "trunk" 140, between the first device 105 and the second device 110. As mentioned above, a trunk may provide increased bandwidth between two points in a network. For example, if links 115–117 each individually have a bandwidth of 100 Mbps, the resulting bandwidth of the trunk 140 is the sum of the bandwidths of the individual links (100 Mbps+100 Mbps+100 Mbps=300 Mbps).

At this point, it is important to recognize that two types of network devices have emerged. The first type of device (hereinafter "MODE 1 device") has the same media access control (MAC) address on its trunked ports. The second type of device (hereinafter "MODE 2 device") has a different MAC address on each trunked port.

One limitation of conventional switches is the fact that they are unable to perform upstream load balancing for MODE 1 devices. For example, assuming ports 106–108 of the first device 105 each use the MAC address of the first device 105, the second device 110 will relearn the location for that MAC address each time the first device 105 transmits a packet over a different trunked port 106–108. Consequently, packet trrric destined for the first device 105 over trunk 140 cannot be distributed over the ports 111–113. Rather, the port on which the second device 110 will transmit these packets depends upon which of the ports 106–108 transmitted last.

Based on the foregoing, it is desirable to implement a set of trunking rules relating to learning, forwarding, looping, and load balancing that are compatible with network devices operating in either MODE 1 or MODE 2. Also, in order to avoid introducing delays in packet transmission, it is desirable to update packet forwarding decisions that will be affected by trunk processing on-the-fly.

SUMMARY OF THE INVENTION

A method and apparatus for providing trunking support in a network device is described. According to one aspect of the present invention, a network device includes at least one port that is configured to be included in a trunk. The network device also includes a memory for storing a forwarding database. The forwarding database includes entries containing therein forwarding information for a subset of network addresses. The network device further includes a learning circuit. The learning circuit is coupled to the trunked port and the memory. The learning circuit is configured to modify the forwarding database to reflect an association between the trunked port and a first address contained within a packet received by the trunked port. If the trunk is of a first type, the learning circuit updates the forwarding database based upon a trunk designator corresponding to the trunk; otherwise, the learning circuit updates the forwarding database based upon a port designator corresponding to the trunked port.

According to another aspect of the present invention, a network device includes at least one port that is included in a trunk associated with a second network device. The network device also includes a memory for storing a forwarding database. The forwarding database includes entries that each contain forwarding information for a particular network address. The network device further includes a filtering circuit coupled to the trunked port and the memory for receiving forwarding information corresponding to a destination address contained within a packet. Based upon a predetermined set of trunking rules and one or more characteristics of the trunk, the filtering circuit is configured to modify the forwarding information generated by the forwarding database.

According to another aspect of the present invention, a packet is received by a network device on one of its input ports. The packet contains therein header information including the packet's destination address. A forwarding database is searched for the destination address. If the destination address is not found in the forwarding database and the output trunk is coupled to a network device of a first type, then load balancing is performed to assure the packet is forwarded to only one port of the output trunk However, if the output trunk is coupled to a network device of a second type, then the packet is forwarded to all ports of the output trunk.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for providing trunking support in a network device. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. While the steps of the present invention are preferably performed by the hardware components described below, alternatively, the steps may be embodied in machine-executable instructions, which may be used to cause a general-purpose or special-purpose processor programmed with the instructions to perform the steps.

AN EXEMPLARY NETWORK ELEMENT

Figure 1:
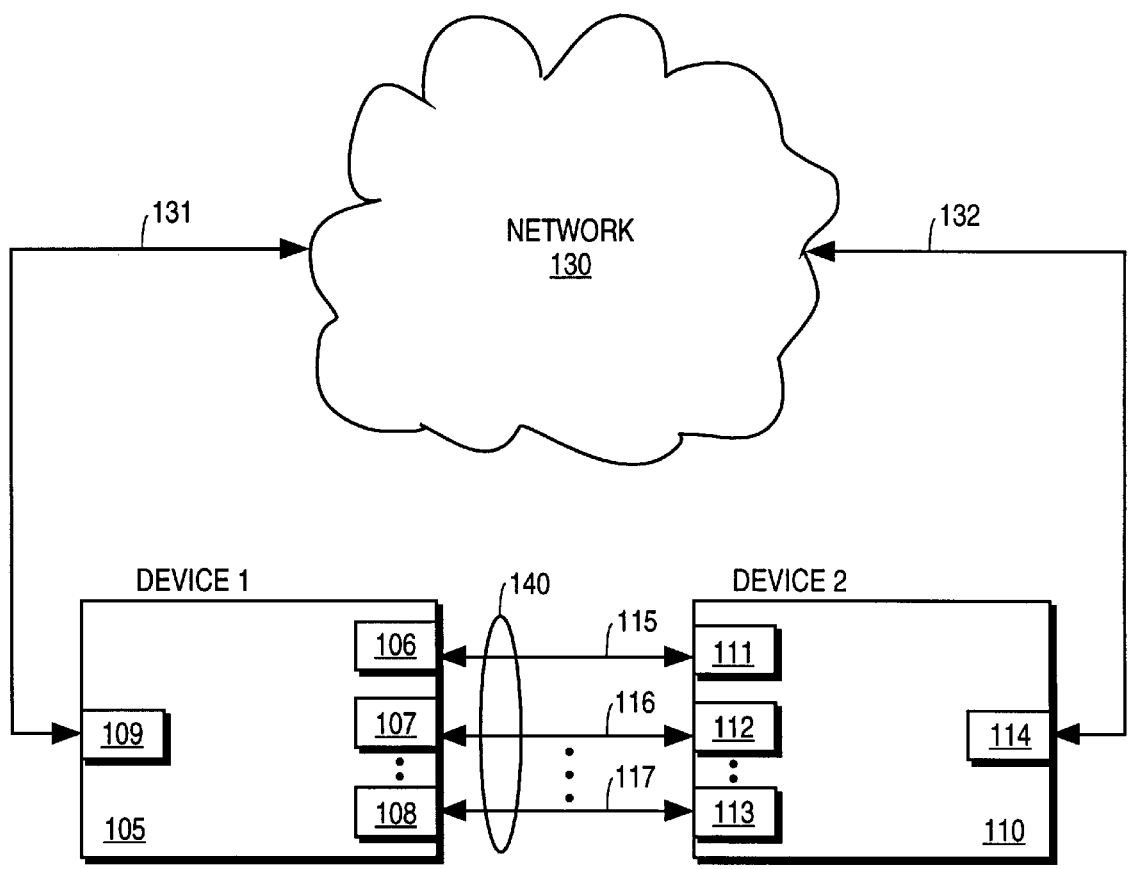
FIG. 1 illustrates two devices coupled in communication via a trunk.
Figure 2:
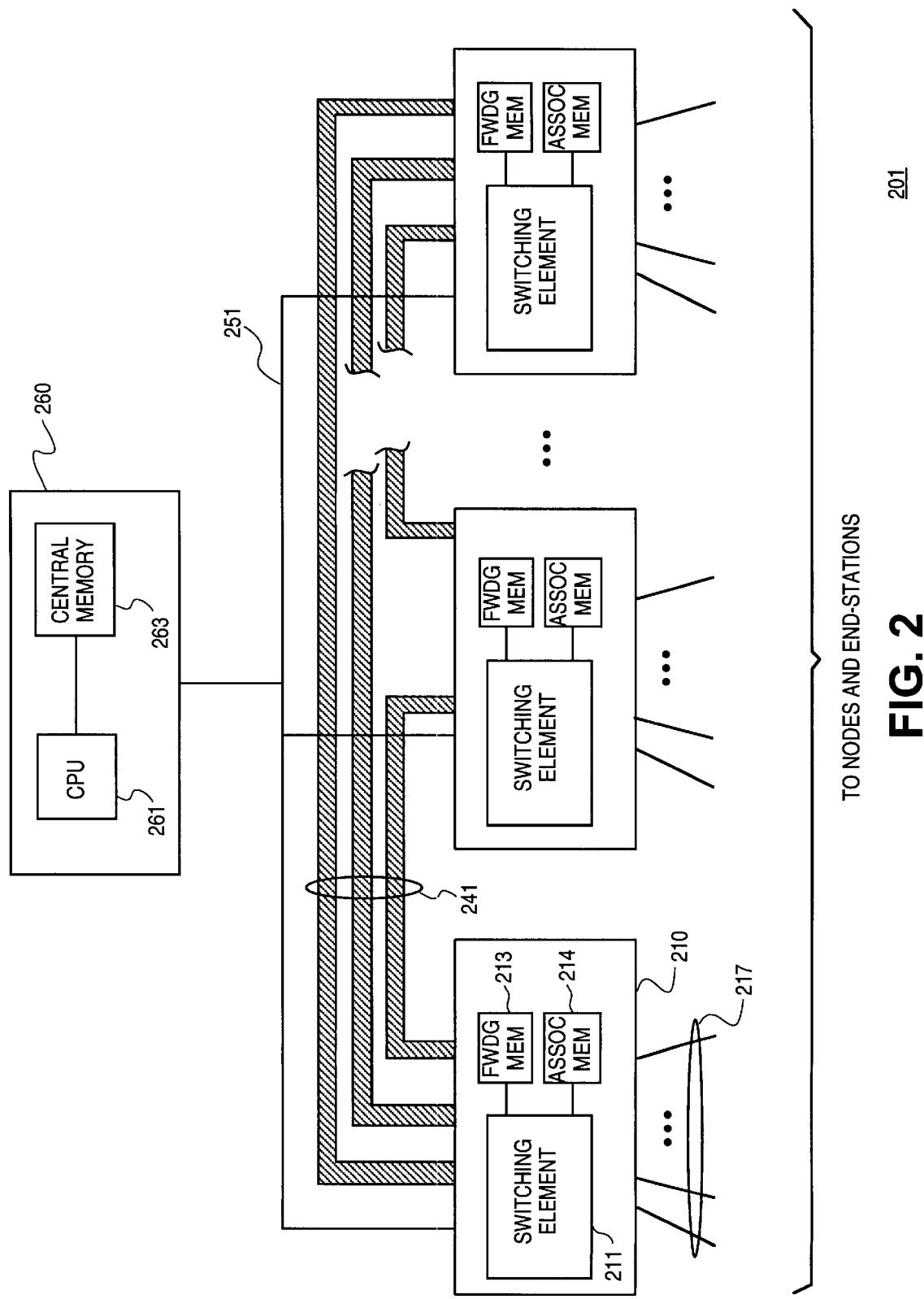
FIG. 2 illustrates a switch according to one embodiment of the present invention.

An overview of one embodiment of a network element that operates in accordance with the teachings of the present invention is illustrated in FIG. 2. The network element is used to interconnect a number of nodes and end-stations in a variety of different ways. In particular, an application of the multi-layer distributed network element (MLDNE) would be to route packets according to predefined routing protocols over a homogenous data link layer such as the IEEE 802.3 standard, also known as the Ethernet. Other routing protocols can also be used.

The MLDNE's distributed architecture can be configured to route message traffic in accordance with a number of known or future routing algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. The TCP is also referred to here as a Layer 4 protocol, while the IP is referred to repeatedly as a Layer 3 protocol.

In one embodiment of the MLDNE, a network element is configured to implement packet routing functions in a distributed manner, i.e., different parts of a function are performed by different subsystems in the MLDNE, while the final result of the functions remains transparent to the external nodes and end-stations. As will be appreciated from the discussion below and the diagram in FIG. 2, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 2, the MLDNE 201 contains a number of subsystems 210 that are fully meshed and interconnected using a number of internal links 241 to create a larger switch. At least one internal link couples any two subsystems. Each subsystem 210 includes a switch element 200 coupled to a forwarding and filtering database 240, also referred to as a forwarding database. The forwarding and filtering database may include a forwarding memory 213 and an associated memory 214. The forwarding memory (or database) 213 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 217. In one embodiment, each subsystem supports multiple Gigabit Ethernet ports, Fast Ethernet ports and Ethernet ports. Internal ports (not shown) also having input and output capability in each subsystem couple the internal links 241. Using the internal links, the MLDNE can connect multiple switching elements together to form a multigigabit switch.

The MLDNE 201 further includes a central processing system (CPS) 260 that is coupled to the individual subsystem 210 through a communication bus 251 such as the peripheral components interconnect (PCI). The CPS 260 includes a central processing unit (CPU) 261 coupled to a central memory 263. Central memory 263 includes a copy of the entries contained in the individual forwarding memories 213 of the various subsystems. The CPS has a direct control and communication interface to each subsystem 210 and provides some centralized communication and control between switch elements.

AN EXEMPLARY SWITCH ELEMENT

Figure 3:
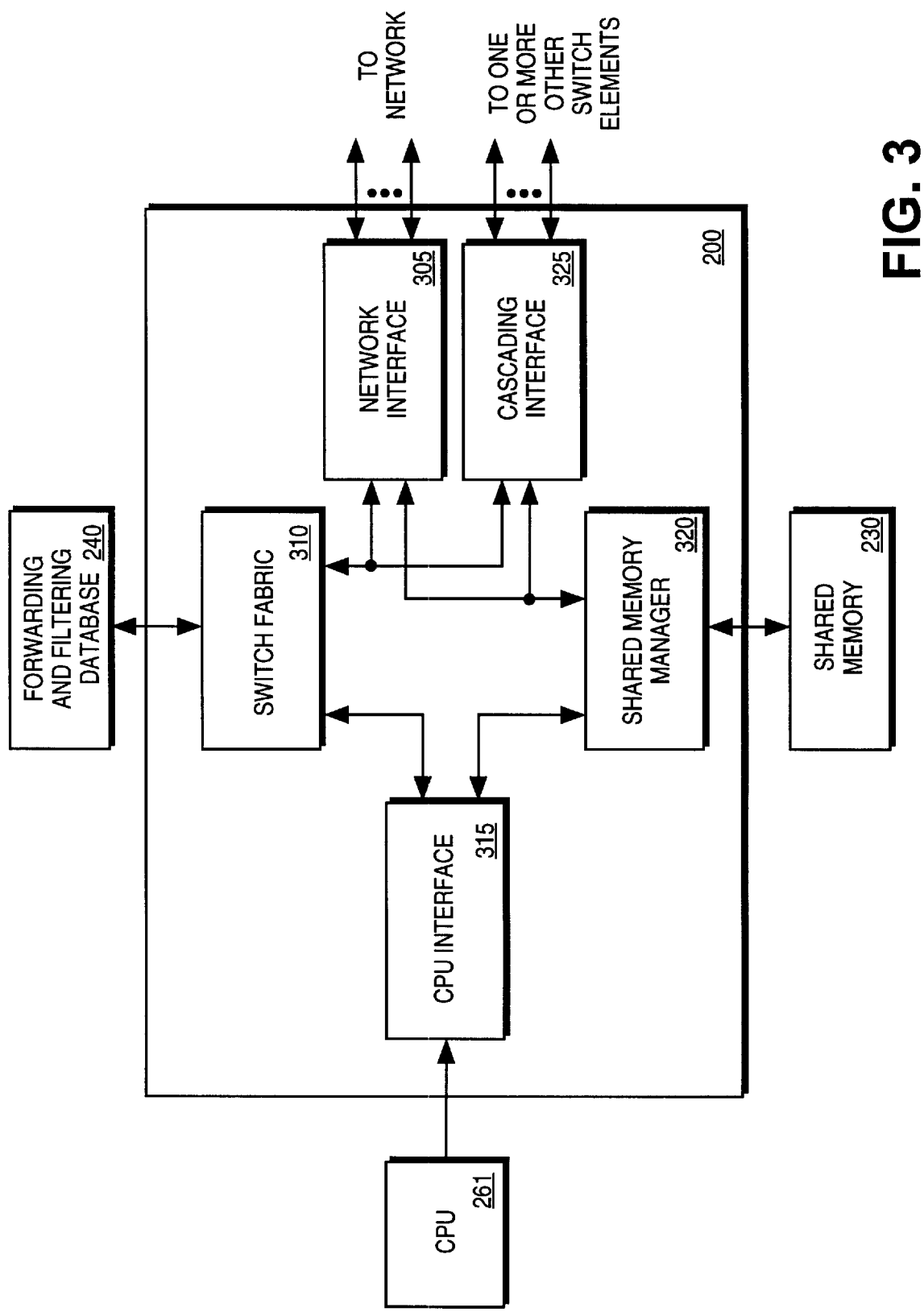
FIG. 3 is a high level block diagram of a switch element in which one embodiment of the present invention may be implemented.

FIG. 3 is a simplified block diagram illustrating an exemplary architecture of the switch element of FIG. 2. The switch element 200 depicted includes a central processing unit (CPU) interface 315, a switch fabric block 310, a network interface 305, a cascading interface 325, and a shared memory manager 320.

Ethernet packets may enter or leave the network switch element 200 through any one of the three interfaces 305, 315, or 325. In brief, the network interface 305 operates in accordance with a corresponding Ethernet protocol to receive Ethernet packets from a network (not shown) and to transmit Ethernet packets onto the network via one or more external ports (not shown). An optional cascading interface 325 may include one or more internal links (not shown) for interconnecting switching elements to create larger switches. For example, each switch element may be connected together with other switch elements in a fall mesh topology to form a multi-layer switch as described above. Alternatively, a switch may comprise a single switch element 200 with or without the cascading interface 325.

The CPU 261 may transmit commands or packets to the network switch element 200 via the CPU interface 315. In this manner, one or more software processes running on the CPU may manage entries in an external forwarding and filtering database 240, such as adding new entries and invalidating unwanted entries. In alternative embodiments, however, the CPU may be provided with direct access to the forwarding and filtering database 240. In any event, for purposes of packet forwarding, the CPU port of the CPU interface 315 resembles a generic input port into the switch element 200 and may be treated as if it were simply another external network interface port. However, since access to the CPU port occurs over a bus such as a peripheral components interconnect (PCI) bus, the CPU port does not need any media access control (MAC) functionality.

Returning to the network interface 305, the two main tasks of input packet processing and output packet processing will now briefly be described. Input packet processing may be performed by one or more input ports of the network interface 305. Input packet processing includes the following: (1) receiving and verifying incoming Ethernet packets, (2) modifying packet headers when appropriate, (3) requesting buffer pointers from the shared memory manager 320 for storage of incoming packets, (4) requesting forwarding decisions from the switch fabric block 310, (5) transferring the incoming packet data to the shared memory manager 320 for temporary storage in an external shared memory 230, and (5) upon receipt of a forwarding decision, forwarding the buffer pointer(s) to the output port(s) indicated by the forwarding decision. Output packet processing may be performed by one or more output ports of the network interface 305. Output processing includes requesting packet data from the shared memory manager 320, transmitting packets onto the network, and requesting deallocation of buffer(s) after packets have been transmitted.

The network interface 305, the CPU interface 315, and the cascading interface 325 are coupled to the shared memory manager 320 and the switch fabric block 310. Preferably, critical functions such as packet forwarding and packet buffering are centralized as shown in FIG. 3. The shared memory manager 320 provides an efficient centralized interface to the external shared memory 230 for buffering of incoming packets. The switch fabric block 310 includes a search engine and learning logic for searching and maintaining the forwarding and filtering database 240 with the assistance of the CPU.

The centralized switch fabric block 310 includes a search engine that provides access to the forwarding and filtering database 240 on behalf of the interfaces 305, 315, and 325. Packet header matching, Layer 2 based learning, Layer 2 and Layer 3 packet forwarding, filtering, and aging are exemplary functions that may be performed by the switch fabric block 310. Each input port is coupled with the switch fabric block 310 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switch element 200.

In the present embodiment, Ethernet packets are centrally buffered and managed by the shared memory manager 320. The shared memory manager 320 interfaces every input port and output port and performs dynamic memory allocation and deallocation on their behalf, respectively. During input packet processing, one or more buffers are allocated in the external shared memory 230 and an incoming packet is stored by the shared memory manager 320 responsive to commands received from the network interface 305, for example. Subsequently, during output packet processing, the shared memory manager 320 retrieves the packet from the external shared memory 230 and deallocates buffers that are no longer in use. To assure no buffers are released until all output ports have completed transmission of the data stored therein, the shared memory manager 320 preferably also tracks buffer ownership.

The present invention may be included in a switch element such as switch element 200. However, the method and apparatus described herein are equally applicable to other types of network devices such as repeaters, bridges, routers, brouters, and other network devices.

OVERVIEW OF TRUNKING RULES AND CONCEPTS

Load balancing, e.g., the spreading of packet traffic over different links of a trunk, and avoidance of packet duplication are objectives that should be satisfied by the two network devices connected to both ends of the trunk. The present invention employs the following concepts and adheres to the following rules in order to achieve these goals.

Both MODE 1 and MODE 2 devices are supported and mixing and matching among ports is allowed. One or more programmable registers or other memory may store an indication for differentiating between the two modes. When the indication is in a first state, learning and forwarding processing for the particular port are configured for compatibility with MODE 1 devices, for example. Similarly, when the indication is in a second state, learning and forwarding processing are configured for compatibility with MODE 2 devices.

Before discussing the rules and concepts related to learning, Layer 2 based learning will briefly be described. Layer 2 based learning is the process of constantly updating the MAC address portion of the forwarding database based on the traffic that passes through the switching device. When a packet enters the switching device, an entry is created (or an existing entry is updated) in the database that correlates the MAC source address of the packet with the input port upon which the packet arrived. Multicast addresses are set up by software rather than learned by the hardware. In any event, between the learning process and software mapping of destination addresses to ports, the switching device knows on which subnet a given node resides.

Continuing now with the rules and concepts related to learning, depending on the type of device that originated the packet (e.g., MODE 1 or MODE 2 device), trunk numbers or port numbers may be learned and/or stored in the forwarding and filtering database. As described in the background, packets originating from a MODE 1 device will have the same MAC SA in their headers regardless of the port upon which they are transmitted. Consequently, if a port number were to be associated with the MAC SA, the MAC SA would be relearned upon receipt of each subsequent packet transmitted by the device on a different port. Therefore, for trunked ports coupled to MODE 1 devices, it is better to use a trunk number for purposes of learning. In contrast, packets received from a MODE 2 device will have a different MAC SA depending on the port upon which the packet was transmitted. For these types of devices, it is convenient to associate a port number with the MAC SA. At any rate, the learned port or trunk number may be encoded as a "port mask". For example, a set of N bits may be used to encode a port forwarding mask for N ports. When the bit in position X of the set of N bits is in a first state, the packet is to be forwarded to port X. However, when the bit is in a second state, the packet is to be filtered. Of course, those of ordinary skill in the art will appreciate that alternative representations may be used.

Throughout this application it will be assumed masks are employed to represent the portion of a forwarding decision indicating outbound ports. With respect to forwarding, therefore, a unicast packet will only have one bit set to the forwarding state in the port mask provided to the input port that requested the forwarding decision. However, the port mask corresponding to a multicast packet may have several bit positions set to the forwarding state. Also, unknown unicast packets (e.g., those packets having destination address that have not been learned by this network device) may have all bits set to the forwarding state (e.g., to flood the packet).

At this point it may be instructive to explain the usage of the terms "known" and "unknown" in the context of a learning and forwarding network device. Packets are said to be known when the packet's destination address has been learned and is found in the forwarding database. In contrast, packets are said to be unknown when the packet's destination address has not been learned or is not found in the forwarding database.

With respect to forwarding, any packet (known unicast, multicast, or unknown unicast) should not be received on more than one port of a multi-homed device. Since all ports of a MODE 1 device have the same MAC address, all ports of the MODE 1 device will respond in the same manner to a received packet. That is, all ports will either accept the packet or all ports will filter the packet. Therefore, it is important to assure that only one packet will be forwarded to trunked ports coupled to MODE 1 devices. In contrast, since the ports of MODE 2 devices each have their own MAC addresses, only one port will be capable of receiving a given unicast packet. Given these characteristics of MODE 1 and MODE 2 devices, load balancing is applied to all packets forwarded to MODE 1 devices and load balancing only needs to be applied to multicast packets forwarded to MODE 2 devices. Further, unknown unicast packets are forwarded to only one port of a trunk coupled to a MODE 1 device and may be forwarded to all ports of a trunk coupled to a MODE 2 device.

With respect to looping, any packet (known unicast, multicast or unknown unicast) arriving on a trunk should not be forwarded to other ports of the same trunk with the exception of a packet that is part of a Layer 3 protocol unicast route.

Several simplifying assumptions may also be made to reduce the complexity of trunk processing. For example, trunking may always be considered enabled. Given this assumption, a single port may be treated as a trunk of size one. Also, if the trunked ports are contiguously assigned and the trunk number is defined as the smallest port number in a trunk other advantages can be achieved as will be understood from the discussion below. Further, load balancing may be approximated. The packet traffic on a particular trunk need not be shared precisely among the participating ports. All that is needed is a mechanism to somewhat randomize the flow of packets through the trunk to assure that a particular trunked port is not over or under utilized. This balancing can be achieved in a number of ways. One method is to employ a hash function or the like as will be described in more detail below.

TRUNK LEARNING AND FILTERING

Figure 4:
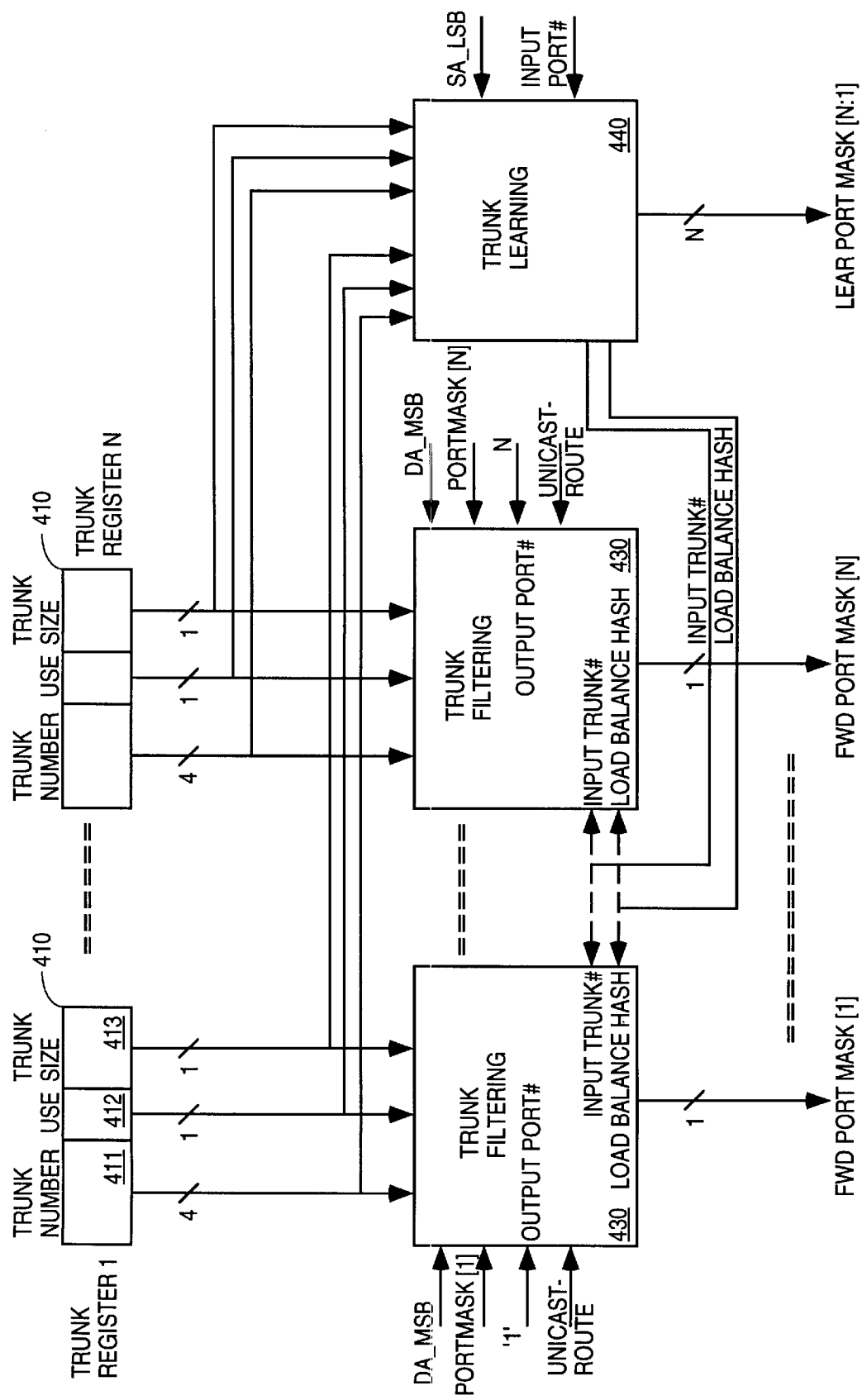
FIG. 4 is a block diagram which illustrates the interaction of trunk forwarding circuitry and trunk learning circuitry according to one embodiment of the present invention.

Having briefly described the rules and concepts related to load balancing, learning, forwarding, and looping, exemplary logic and steps for implementing these rules will now be described. FIG. 4 is a block diagram of trunk logic within the switch fabric 310 according to one embodiment of the present invention. In this embodiment, a trunk register is provided for each of N ports. Port 1 corresponds to a first trunk register 410, Port N corresponds to the last trunk register 420. Preferably, each register is of the form of registers 410 and 420. Register 410 includes a trunk number field 411, a use trunk number field 412, and a trunk size field 413. The trunk number field 411, in this example, is a four bit value that stores a trunk number corresponding to the trunk in which this port is a member. In one embodiment, the trunk number is the lowest port number of the ports in the trunk. This choice of trunk number has advantages that will be discussed below with respect to load balancing.

Continuing with this example, a one bit field, the use trunk number field 412, is used to indicate whether or not to use the trunk number 411 for the particular port for purposes of executing learning and forwarding. Typically, the port number is used for ports attached to MODE 2 devices and the trunk number is used for ports attached to MODE 1 devices. Finally, in the embodiment depicted, the trunk size 413 is a three bit field for indicating the number of ports in the trunk. While, for purposes of this example, the trunk characteristics have been described as being stored in registers, it will be recognized that numerous other storage mechanisms are possible.

The trunk learning and filtering logic of the present invention also includes a trunk filter block 430 for each port and a common trunk learning block 440. The registers are coupled to the corresponding filter block 430 and the learning block 440 to provide the trunk information to these blocks. Other inputs to the blocks may include a portion of the most significant bits (MSBs) of the packet's destination address, the individual port mask bits from the filtering and forwarding database, the input trunk number, the input port number, a portion of the least significant bits (LSBs) of the packet's source address, and Layer 3 information such as whether or not the packet is part of a unicast route. Given the inputs described above, during the learning process, the learning block 440 produces a port mask (e.g., LearnPortMask[N:1]) that will be stored in the forwarding and filtering database. Further, during the forwarding process, each filter block 430 contributes a bit toward a final forwarding port mask (e.g., FwdPortMask[N:1]). The final forwarding port mask is ultimately communicated to the input port that requested the forwarding decision for this particular packet.

TRUNK PROCESSING OVERVIEW

Figure 5:
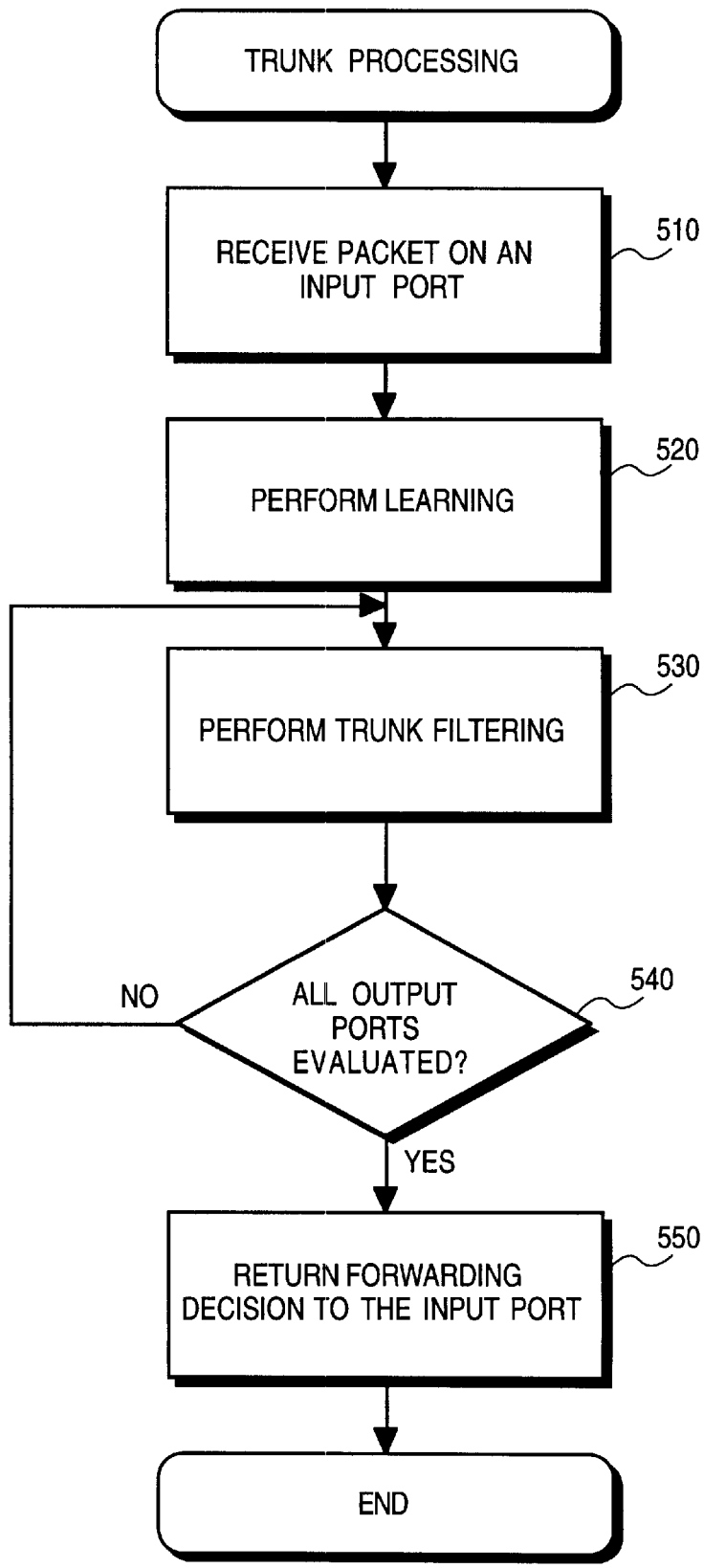
FIG. 5 is a high level flow diagram illustrating trunk processing according to one embodiment of the present invention.

Having described an exemplary environment in which the present invention may be implemented, trunk processing will now be described. FIG. 5 is a high level flow diagram illustrating trunk processing according to one embodiment of the present invention. At step 510, a packet is received on an input port of the network interface 305 or the cascading interface 325. At the appropriate point during reception of the incoming packet, the input port requests from the switch fabric block 310 a forwarding decision and a learn cycle.

At step 520, learning is performed. Conventionally, learning is the association of an incoming packet's MAC SA and its port of arrival. However, the present invention accommodates trunking by allowing a representation of a trunk designator to be associated with the incoming packet's MAC SA in certain circumstances which will be described below with respect to FIG. 6B. In any event, during the learning process, the forwarding and filtering database is updated to reflect the new information learned as a result of the newly received packet. For example, if the MAC SA is not found in the forwarding and filtering database, then a new entry is created and stored in the forwarding and filtering database so subsequent packets destined for that MAC address can be forwarded appropriately. Alternatively, if the MAC SA is found the port or trunk associated with the MAC address is updated and an age indication is cleared.

At step 530, trunk filtering is performed. Trunk filtering is the mechanism by which one or more ports of a particular trunk are selected on which to forward the current packet. The filtering of step 530 is performed on the fly upon data such as a port list that has been retrieved from the forwarding and filtering database. In this example, it is assumed that the port list (e.g., the portion of the forwarding decision that indicates the ports on which to forward the packet) is a "port mask". It should be appreciated that if the port mask retrieved from the forwarding and filtering database indicates a packet should be filtered for a particular port, this decision will not be reversed by the trunk filtering logic. As the name implies, the trunk filtering logic will only change a bit in the port mask from the forward state to the filter state.

At step 540, after all output ports have performed the filtering logic of step 530, processing continues with step 550. While the filtering logic of step 530 may be performed serially as depicted in the flow diagram, it is appreciated multiple circuits may be used to perform the filtering for each port in parallel. Finally, at step 550, the forwarding decision is returned to the input port from which it was requested.

EXEMPLARY TRUNK LEARNING MODULE

Figure 6A:
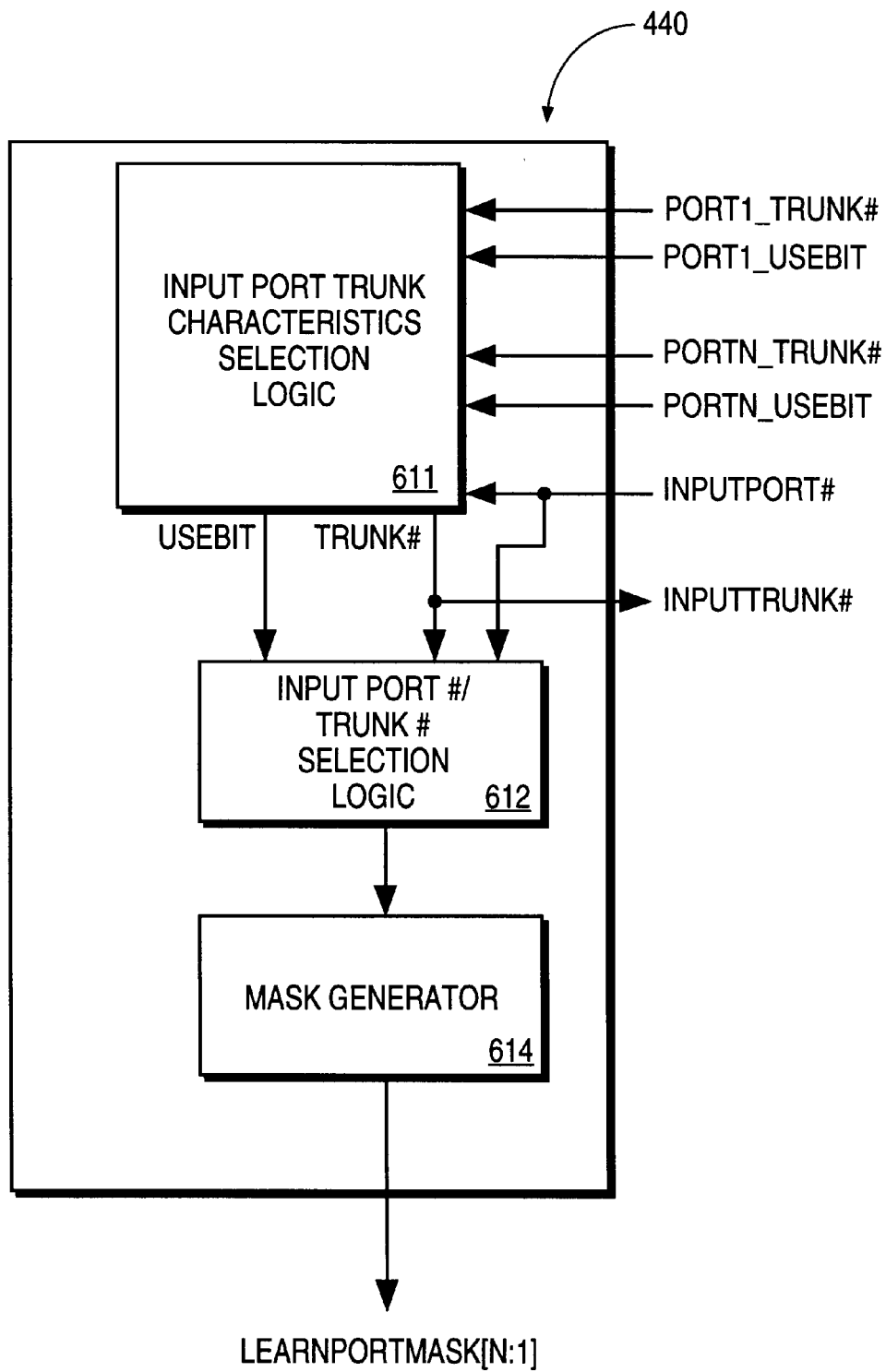
FIG. 6A is a block diagram which illustrates an exemplary trunk learning module according to one embodiment of the present invention.

FIG. 6A is a block diagram which illustrates an exemplary trunk learning module according to one embodiment of the present invention. In this embodiment, the trunk learning block 440 includes input port trunk characteristics selection logic 611, input port number/trunk number selection logic 612, and a mask generator 614. The input port trunk characteristics selection logic 611 receives the trunk characteristics of each trunk and outputs the characteristics corresponding to the trunk to which the input port belongs.

The input port number/trunk number selection logic 612 is coupled to the trunk characteristics selection logic 611 to receive the usebit and the trunk number for the input port. The input port number/trunk number selection logic 612 outputs the trunk number if the usebit is in a first state that indicates the trunk number is to be used, otherwise the input port number is output.

The mask generator 614 is coupled to the output of the input port number/trunk number selection logic 612 for receiving the input trunk number or the input port number. According to this embodiment, a port mask (e.g., LearnPortMask[N: 1]) is generated that corresponds to the number input from the input port number/trnk number selection logic 612. For example, if the mask generator 614 receives the number 5 and the network device has N=8 ports, then a port mask of 00010000 might be generated. The 5th bit of the eight bit mask is set indicating packets destined for the address being learned should be forwarded to port or trunk number 5 depending upon the state of the usebit.

LEARNING PROCESSING

Figure 6B:
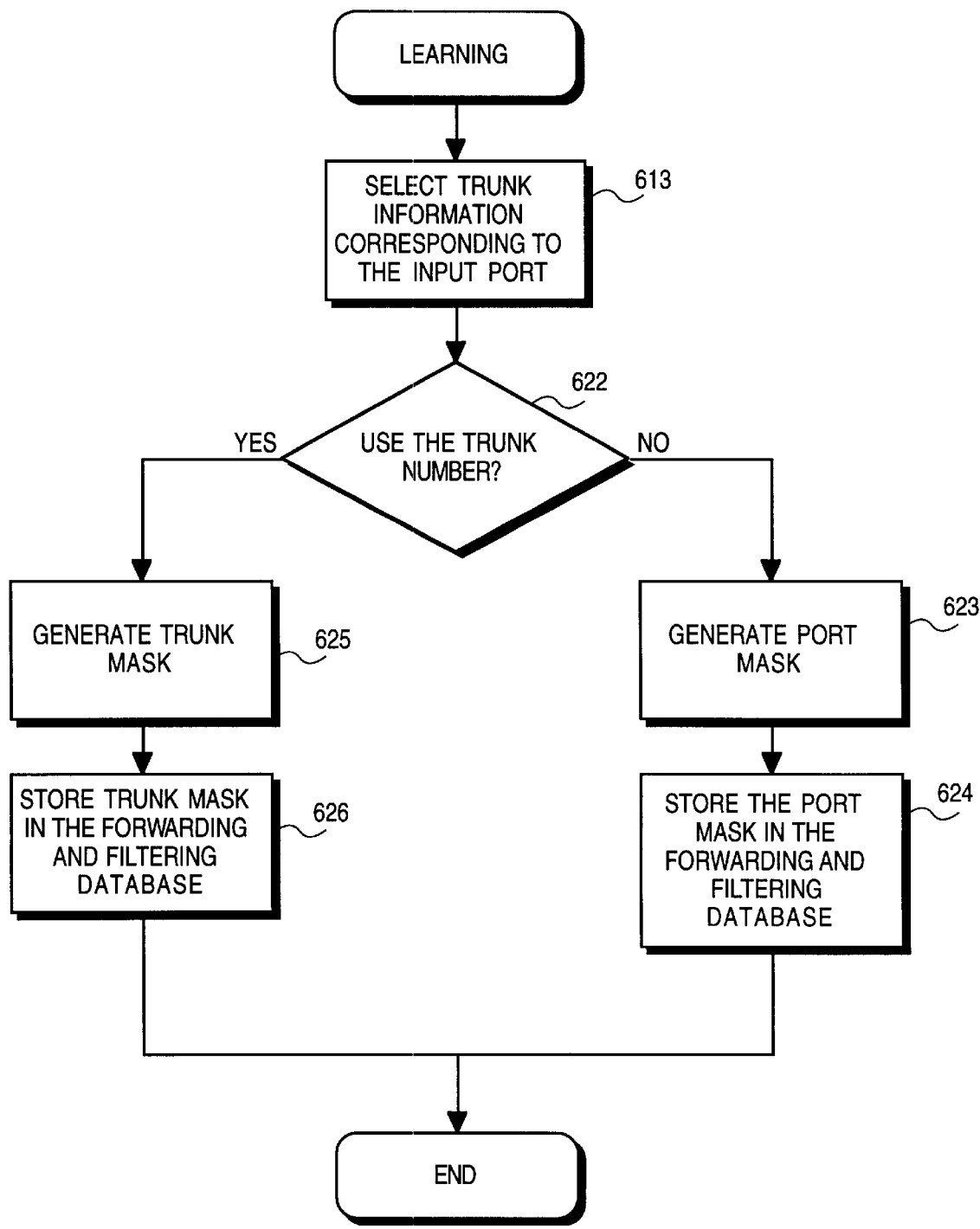
FIG. 6B is a flow diagram illustrating Layer 2 learning according to one embodiment of the present invention.

FIG. 6B is a flow diagram illustrating a method of Layer 2 learning according to one embodiment of the present invention. At step 613, a set of data representing the trunk information corresponding to the input port is selected.

At step 622, a determination is made as to whether the trunk number should be used or the port number. In this embodiment, the determination is made with reference to the type of device (e.g., MODE 1 or MODE 2) from which the packet was received. If the port number is to be used, the learning processing continues with step 623, otherwise the processing continues with step 625.

At step 623, a representation of the port number such as a port mask is generated. At step 624, the port mask is stored in the forwarding and filtering database.

If the trunk number is to be used, a representation of the trunk number, in the form of a mask, for example, is generated in step 625. Then, at step 626, the trunk mask is stored in the forwarding and filtering database at step.

EXEMPLARY TRUNK LEARNING LOGIC

Figure 6C:
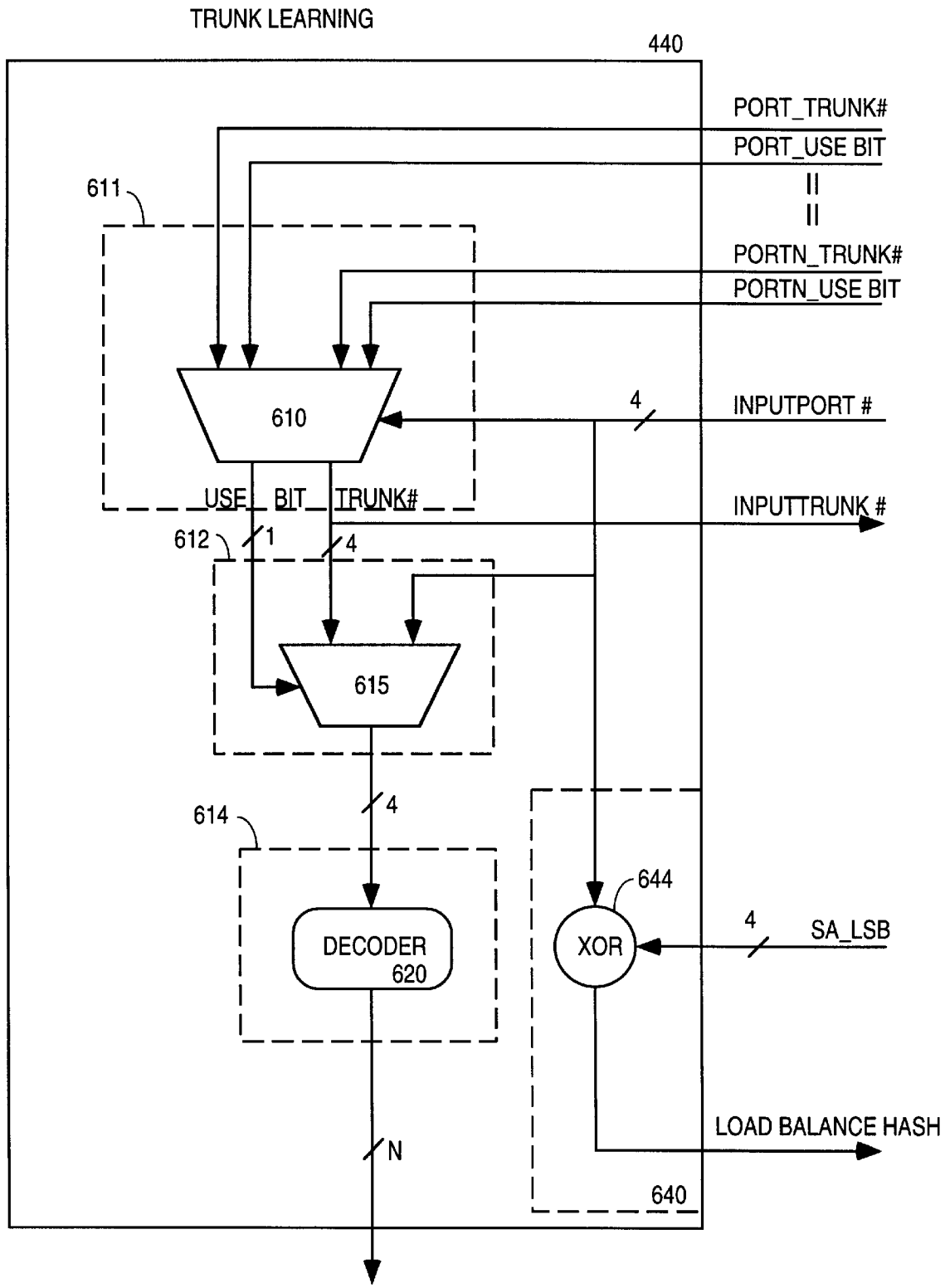
FIG. 6C illustrates exemplary logic for implementing the trunk learning module of FIG. 6A.

FIG. 6C illustrates exemplary logic for implementing the trunk learning module of FIG. 6A. In this embodiment, the trunk characteristics selection logic 611 includes a multiplexer (MUX) 610. The trunk number output from the MUX 610 and the input port number are inputs to a MUX 615. The usebit output of MUX 610 is the select input to MUX 615. The output of MUX 615 is coupled to the input of a decoder 620, which implements the port mask generation.

With respect to the portion of the load balance logic 640 shown in the trunk leaning block 440, the exclusive or logic 644 produces a hash result based upon the input port number and a portion of the source address of the incoming packet. Other methods of generating a pseudo random or random number such as a random number generator may alternatively be employed. In any event, so long as the logic that produces the LoadBalanceHash is not dependent upon the output port it is preferable to avoid duplicating this common function unnecessarily. However, this logic may be located in the trunk filtering block 430 or elsewhere in alternative embodiments.

EXEMPLARY TRUNK FILTERING MODULE

Figure 7A:
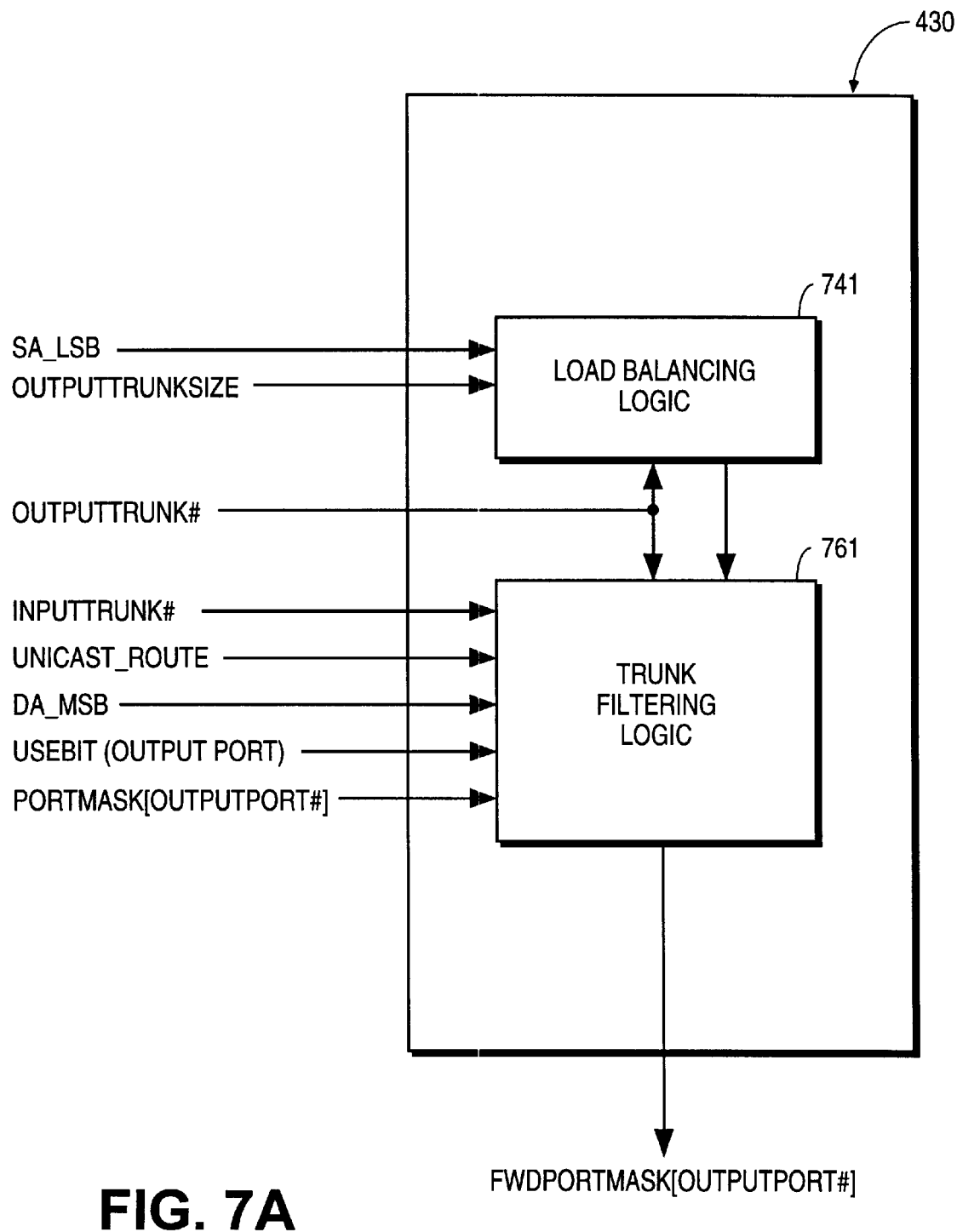
FIG. 7A is a block diagram which illustrates an exemplary trunk filtering module according to one embodiment of the present invention.

FIG. 7A is a block diagram which illustrates an exemplary trunk filtering module according to one embodiment of the present invention. In this embodiment, the trunk filtering block 430 includes load balancing logic 741 and trunk filtering logic 761. The load balancing logic 741 outputs a signal to the trunk filtering logic 761 indicating whether or not the output port corresponding to this trunk filtering module has been selected as a port on which the packet should be forwarded for purposes of load balancing. Load balancing is applied to all packets destined to a MODE 1 device and multicast packets destined to a MODE 2 device.

The trunk filtering logic 761 implements the logic discussed above with reference to the trunking rules and concepts.

FILTERING PROCESSING

Figure 7B:
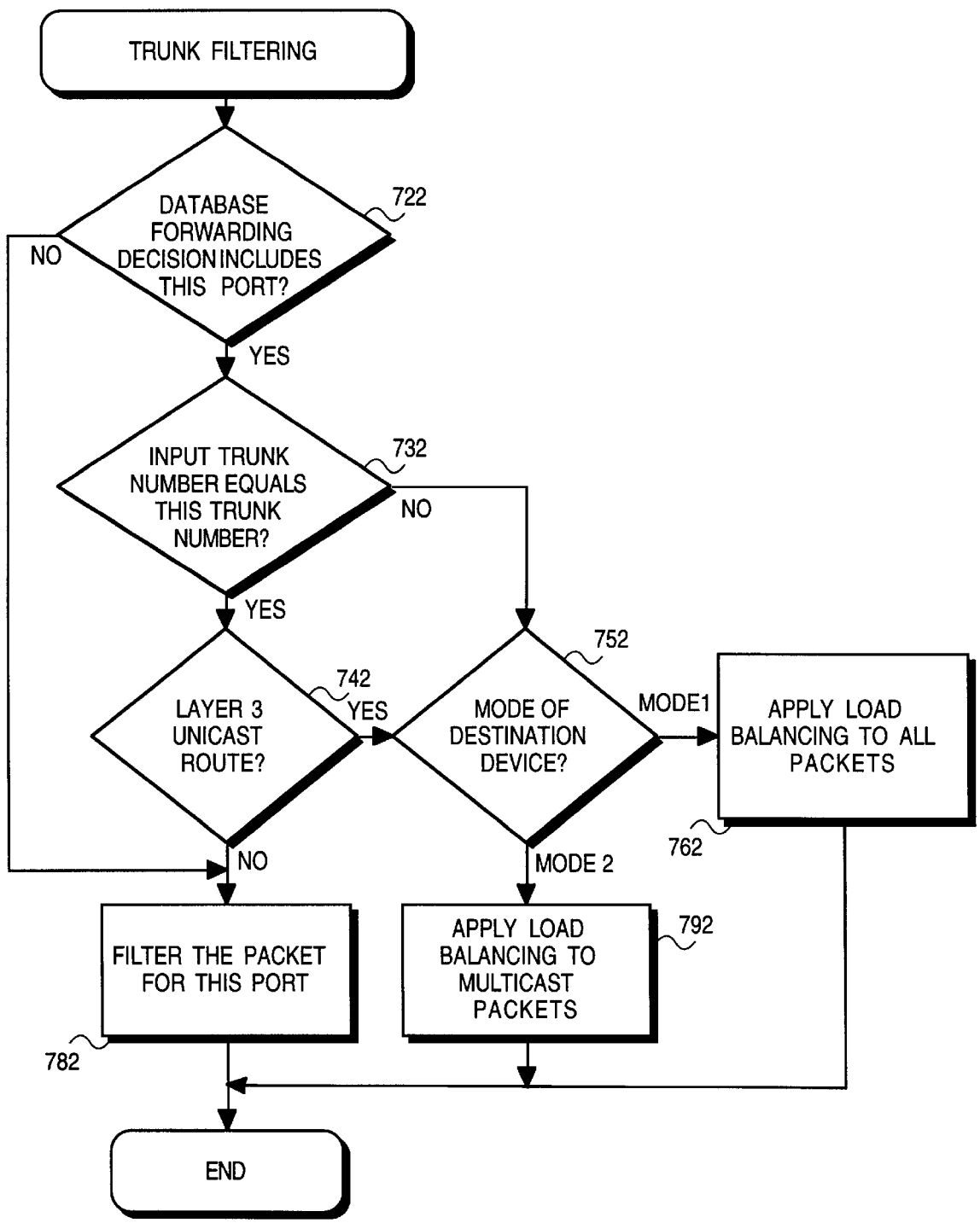
FIG. 7B is a flow diagram illustrating trunk filtering according to one embodiment of the present invention.

FIG. 7B is a flow diagram illustrating a method of trunk filtering according to one embodiment of the present invention. For each port a decision needs to be made whether to forward the current packet or filter it. The bit corresponding to this particular port in the port mask may be set to a zero to indicate not to forward the packet, for example.

At step 722, it is determined whether or not the entry retrieved from the forwarding and filtering database has directed the packet to be forwarded onto the output port. If so, one or more further tests may be performed starting at step 732. Otherwise, the filtering decision as communicated by the filtering and forwarding database is final and the packet is filtered for this port (step 782).

Only packets that are part of a Layer 3 protocol unicast route can be forwarded over the port or trunk upon which they were received. Therefore, at step 732, a comparison is made between the input trunk number and the output trunk number. If the output trunk number is equal to the input trunk number then step 742 is executed to determine if the packet is part of a unicast route; otherwise, step 752 is executed to determine the mode of the destination device.

If, at step 742, it is determined that the packet is part of a Layer 3 protocol unicast route, then processing continues with step 752. However, if the packet is not part of a Layer 3 protocol unicast route, the packet will be filtered at step 782.

At step 752, based upon the mode of the destination device, load balancing will be applied to multicast packets (step 792) or load balancing will be applied to all packets (step 762).

LOAD BALANCING PROCESSING

Figure 7C:
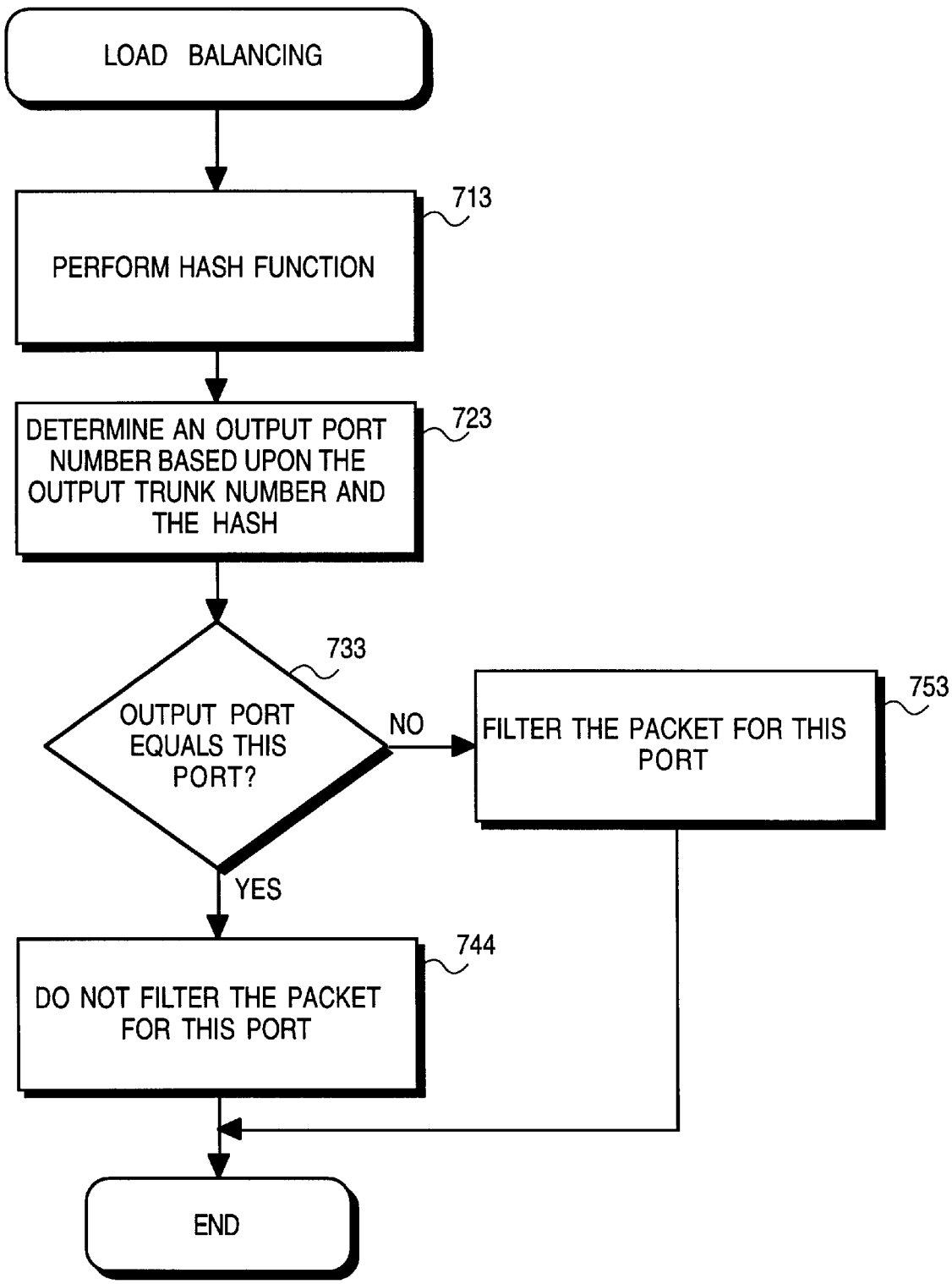
FIG. 7C is a flow diagram illustrating load balancing according to one embodiment of the present invention.

FIG. 7C is a flow diagram illustrating a method of load balancing according to one embodiment of the present invention.

At step 713, a hash function is performed to map packets that would otherwise be received by multiple interfaces of a multi-homed device to a single port of a trunk. Essentially, the idea is to spread the packet traffic load among the ports of a given trunk and also to prevent duplicate packets from being received at the destination. Many alternatives exist for meeting this criteria such as the exclusive or logic 644 combined with the Modulo operation 741 of FIGS. 6C and 7D, a random number generator, or the like.

At step 723, an output port number is determined based upon the output trunk number and the hash result. Preferably, the trunk number corresponds to the lowest number port in the trunk and the hash produces numbers in the range of zero to the number of ports in the trunk −(minus) 1. For example, if there are three trunked ports numbered 3, 4, and 5, the hash result should be a number between 0 and 2. Then, when the trunk number, 3, is added, the result is one of ports 3, 4, or 5.

At step 733, the output port number selected by steps 713 and 723, is compared to the current port number. For example, assuming a filtering block 430 were being employed for each port, the output port number of step 723 would be compared to the number of the port corresponding to the particular filtering block 430. Thus, a filtering decision is made on a port-by-port basis based upon the output port chosen by the load balancing logic. In this manner, packets destined for a MODE 1 device will only be forwarded over one of the trunked ports coupled to the MODE 1 device. Further, multicast packets destined for a MODE 2 device will only be forwarded over one of the trunked ports coupled to the MODE 2 device.

At step 744, if it was determined that the current port corresponds to the output port selected by steps 713 and 723, then the packet will not be filtered for the current port and the packet will ultimately be forwarded over the current port. Otherwise, the packet will not be forwarded to the current port (step 753).

EXEMPLARY TRUNK FILTERING LOGIC

Figure 7D:
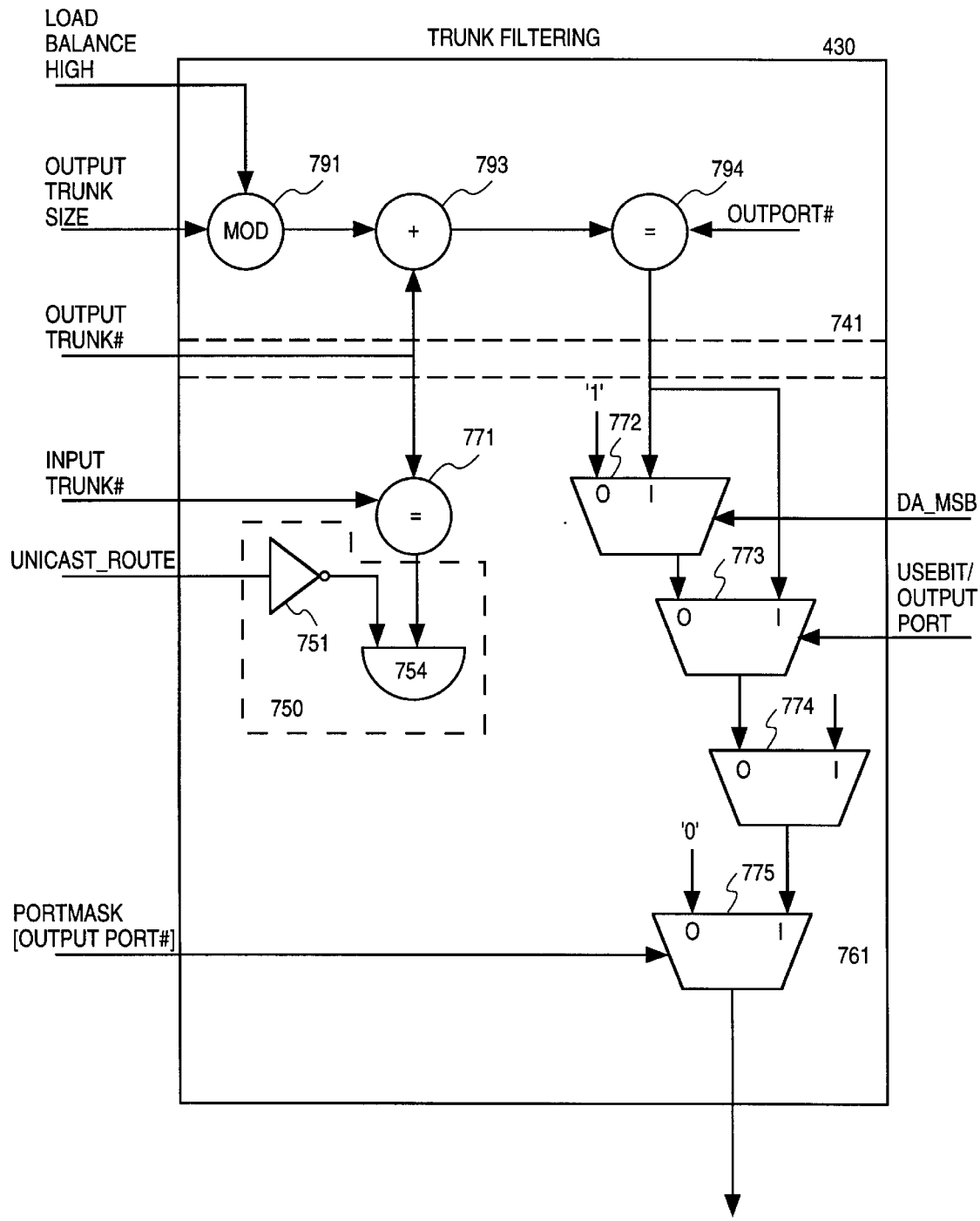
FIG. 7D illustrates exemplary logic for implementing the trunk filtering module of FIG. 7A.

FIG. 7D illustrates exemplary logic for implementing the trunk filtering module of FIG. 7A. In the embodiment depicted, a modulus operation 791 receives the LoadBalanceHash and the OutputTrnnkSize and outputs a number between zero and the OutputTrunkSize-1. An adder 793 accepts as inputs the result of the modulus operation 791 and the OutputTrunk#. After adding the OutputTrunk# (e.g., the smallest port number of the trunked ports) and the result of the modulus operation 791, the result is a number between the smallest port number and the smallest port number+ OutputTrunkSize-1 inclusive (e.g., the trunked ports). The output of the adder 793 is compared to the OutputPort# by a comparator 794. At this point, a one is output if the Load balancing logic 741 has selected the output port corresponding to this trunk filtering module 430.

The next stage is the trunk filtering logic 761. In this embodiment, the trunk filtering logic 761 is implemented with a plurality of multiplexers 772–775 and unicast route logic 750. MUX 772 applies the load balancing logic results to multicast traffic. MUX 773 applies the load balancing logic results to all output ports that are coupled to MODE 1 devices (i.e., usebit is set for MODE 1 devices).

The unicast route logic 750 outputs a logic one if the packet is not a Layer 3 protocol unicast route packet and the OutputTrunk# is the same as the InputTrunk#. The unicast route logic 750 outputs a logic zero, when the packet is a Layer 3 protocol unicast route packet or the OutputTrunk# is not the same as the InputTrunk#. Thus, only packet destined for an OutputTrunk# different from the InputTrunk# or Layer 3 protocol unicast route packets can be forwarded on a given output port. It should be apparent that many other logic combinations other than an inverter 751 and an and 754 may be used.

Finally, MUX 775 filters packets that are marked as filtered by the forwarding database. Thus, no filtered packets can be "unfiltered" by the Trunk filtering block 430. That is, a PortMask value can only be changed from a one to a zero and not from a zero to a one in the FwdPortMask filter.

It should be appreciated while specific field sizes, block inputs, and block outputs have been used to explain an exemplary embodiment and that the present invention is not limited to such specifics. Further, one of ordinary skill in the art will appreciate the present invention is not limited to hardwired logic. Alternatively, the logic illustrated above may be implemented in machine-executable instructions, which may be used to cause a general-purpose or special-purpose processor to produce the same results, although a relatively larger delay would likely be introduced by such an implementation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A network device comprising:
    a plurality of ports including a first port configured to receive a packet, at least the first port configured to be associated with at wherein the trunk is a logical channel between the network device and another network device that includes two or more physical network links;
    a memory for storing a forwarding database, the forwarding database including a plurality of entries containing therein forwarding information for a subset of addresses; and
    a learning circuit coupled to the first port and the memory configured to modify the forwarding database to reflect an association between the first port and a first address contained within the packet, the learning circuit updating the forwarding database based upon a trunk designator corresponding to the trunk if the trunk is of a first type, the learning circuit updating the forwarding database based upon a port designator corresponding to the first port if the trunk is of a second type. wherein ports associated with trunks of the first type each have the same media access control (MAC) address, and ports associated with trunks of the second type each have a different MAC address.

2. The network device of claim 1, further comprising a filtering circuit coupled to a second port of the plurality of ports and the memory, the filtering circuit configure to receive forwarding information corresponding to a second address contained within a the packet, the filtering circuit further configured to modify the forwarding information based upon a predetermined set of trunking rules.

3. The network device of claim 1, wherein the filtering circuit comprises:
   load balancing logic configured to selectively apply load balancing to outbound packets based upon one or more characteristics of the outbound packets and one or more characteristics of an outbound trunk; and
   trunk filtering logic configured to enforce the predetermined set of trunking rules based upon one or more characteristics of the outbound trunk.

4. The network device of claim 3, wherein the one or more characteristics of the outbound trunk include a number of ports associated with the outbound trunk.

5. The network device of claim 3, wherein the one or more characteristics of the outbound trunk include a trunk designator associated with the outbound trunk.

6. The network device of claim 1, wherein the forwarding database has stored therein a plurality of entries each containing an address field and a designator field, the network device further comprising a search engine coupled to the first port and to the memory, the search engine configured to determine if the address field of an entry of the plurality of entries matches the first address.

7. The network device of claim 6, wherein the search engine includes a programmable register for each of the plurality of ports, each programmable register having stored therein a trunk designator for identifying a group of two or more ports with which the trunk is associated.

8. The network device of claim 7, wherein each programmable register contains a type indicator for indicating which of the trunk designator or the port designator should be used for purposes of learning.

9. The network device of claim 8, wherein the trunk further includes one or more other ports of the plurality of ports.

10. The network device of claim 7, wherein each programmable register contains a trunk size indicating the number of ports that are associated with the trunk.

11. The network device of claim 1, wherein each of the plurality of ports is associated with a port designator, and wherein the trunk designator comprises the smallest port designator of all ports included in the trunk.

12. The network device of claim 1 further including a mask generator for producing a port mask, the port mask including a mask field corresponding to each of the plurality of ports, when the mask field is in a first state the packet may be forwarded to the corresponding port, however when the mask field is in a second state the packet will not be forwarded to the corresponding port.

13. A network device comprising:
   a plurality of ports including a first port configured to transmit a packet to a second network device, at least the first port configured to be included in a trunk associated with the second network device, wherein the trunk is a logical channel between the network device and the second network device that includes two or more physical network links;
   a memory for storing a forwarding database, the forwarding database including a plurality of entries each containing forwarding information for a particular address; and
   a filtering circuit coupled to the first port and the memory, the filtering circuit configured to receive forwarding information corresponding to a destination address contained within the packet, the filtering circuit further configured to modify the forwarding information based upon a predetermined set of trunking rules and one or more characteristics of the trunk.

14. The network device of claim 13, further comprising a search engine coupled to the first port and to the memory, the search engine configured to determine if the forwarding information of an entry of the plurality of entries corresponds to the destination address.

15. The network device of claim 13, wherein the network device further includes a learning circuit coupled to the plurality of ports and the memory, the learning circuit configured to modify the forwarding database to reflect an association between a second port of the plurality of ports upon which the packet arrived and a source address contained within the packet, the learning circuit updating the forwarding database based upon a trunk designator if the second port is of a first type, the learning circuit updating the forwarding database based upon a port designator if the second port is of a second type, wherein ports of the first type each have the same media access control (MAC) address, and ports of the second type each have a different MAC address.

16. The network device of claim 13, wherein the trunk further includes one or more other ports of the plurality of ports.

17. The network device of claim 13, wherein the filtering circuit further comprises load balancing logic configured to selectively apply load balancing to forward the packet to a single port of the plurality of ports based upon one or more characteristics of the packet and one or more characteristics of the trunk.

18. The network device of claim 17, wherein the one or more characteristics of the packet include whether the packet is a unicast packet or a multicast packet.

19. The network device of claim 17, wherein the one or more characteristics of the packet include whether the destination address is a known unicast address or an unknown unicast address.

20. The network device of claim 17, wherein the one or more characteristics of the trunk include a number of ports in the trunk.

21. The network device of claim 17, wherein the one or more characteristics of the trunk include a trunk designator associated with the trunk.

22. The network device of claim 17, wherein the one or more characteristics of the trunk include a device mode associated with the trunk indicating whether ports associated with the trunk each have the same media access control (MAC) address or the ports associated with the trunk each have a different MAC address.

23. A method comprising the steps of:
   receiving a packet on one of a plurality of ports of a network device, the packet containing therein header information including a destination address;
   searching a forwarding database for the destination address; and if the destination address is not found in the forwarding database, then performing load balancing to assure the packet is forwarded to only one port of a trunk if the trunk is coupled to a network device of a first type, wherein the trunk is a logical channel between the network device and another network device including two or more physical network links, and forwarding the packet to all ports of the trunk if the trunk is coupled to a network device of a second type.

24. The method of claim 23, further comprising the step of if the destination address is a multicast address, then performing load balancing to assure the packet is forwarded to only one port of the trunk.

25. The method of claim 23, further comprising the steps of:

if the destination address is a known unicast address, then performing load balancing to determine a single port of the trunk upon which to forward the packet if the trunk is coupled to a network device of the first type, otherwise, if the trunk is coupled to a network device of the second type, forwarding the packet to the port of the plurality of ports associated with the destination address.

26. The method of claim 25, wherein network devices of the first type have the same media access control (MAC) address on all trunked ports, and wherein network devices of the second type have a different MAC address for each trunked port.

27. The method of claim 23, wherein network devices of the first type have the same media access control (MAC) address on all trunked ports, and wherein network devices of the second type have a different MAC address for each trunked port.

28. The method of claim 27 wherein the common trunk designator comprises the smallest port designator of the different port designators.

29. A method for use in a network device, the method comprising the steps of:

receiving a packet on a first port of a plurality of trunked ports in a trunk, wherein the trunk is a logical channel between the network device and another network device including two or more physical network links each of the plurality of trunked ports associated with a different port designator and a common trunk designator;

searching a forwarding database for a source address contained in the packet; and if the source address is not found in the forwarding database, then learning either the common trunk designator or the different port designator associated with the first port based upon a mode of the first port if the first port is in a first mode, the first port has the same media access control (MAC) address as the other trunked ports of the plurality of trunked ports, and if the first port is in a second mode, the first port has a different MAC address than each of the other trunked ports of the plurality of trunked ports.

30. The method of claim 29, wherein the mode of the first port is programmable and wherein the step of learning either the common trunk designator or the different port designator further includes the steps of:

if the first port is programmed to be in the first mode, then creating a forwarding database entry containing therein a representation of the trunk designator;

otherwise, if the first port is programmed to be in the second mode, then creating a forwarding database entry containing therein a representation of the different port designator associated with the first port; and storing the forwarding database entry in the forwarding database.

31. The method of claim 29 wherein the source address is associated with either the common trunk designator or the different port designator associated with the first port by performing the step of storing the source address in the forwarding database entry.

32. A method for use in a network device, the method comprising the steps of:

receiving a packet on a first port of a plurality of ports of the network device;

determining upon which of the plurality of ports to forward the packet by requesting a forwarding decision from a forwarding database;

disallowing the packet from being forwarded over a trunk with which the first port is associated if the packet is not part of a Layer 3 protocol unicast route by performing packet filtering, wherein the trunk is a logical channel between the network device and another network device including two or more physical network links.

33. A method comprising the steps of:

receiving a packet on one of a plurality of ports of a network device, the packet containing therein header information including a destination address;

searching a forwarding database for the destination address; and if the destination address is not found in the forwarding database, then performing load balancing to assure the packet is forwarded to only one port of a trunk if the trunk is coupled to a network device of a first type which has the same media access control (MAC) address on all trunked ports, wherein the trunk is a logical channel between the network device and another network device including two or more physical network links; and forwarding the packet to all ports of the trunk if the trunk is coupled to a network device of a second type which has a different MAC address for each trunked port.

* * * * *